United States Patent [19]
Vidaver et al.

[11] 3,819,482
[45] June 25, 1974

[54] METHOD OF PREPARING HIGH YIELDS OF DOUBLE-STRANDED RIBONUCLEIC ACID

[76] Inventors: Anne M. Vidaver, 2416 Sewell St., Lincoln, Nebr. 68502; James L. Van Etten, 4507 E. Eden Dr., Lincoln, Nebr. 68506; Joseph S. Semancik, 335 Bruce Dr., Lincoln, Nebr. 68510

[22] Filed: May 8, 1972

[21] Appl. No.: 251,257

[52] U.S. Cl. ............... 195/28 N, 195/96, 195/1.5, 260/211.5, 424/85, 424/93
[51] Int. Cl. ........................................... C12d 13/06
[58] Field of Search ........ 195/28 N, 96, 1.1; 424/85

[56] References Cited
UNITED STATES PATENTS

| | | | |
|---|---|---|---|
| 3,582,469 | 6/1971 | Birnbaum | 195/28 N |
| 3,583,893 | 6/1971 | Lago | 195/28 N |

OTHER PUBLICATIONS
Field et al., National Academy of Science Proceedings, Vol. 58, No. 5, pages 2102–2108 (1967).

*Primary Examiner*—Alvin E. Tanenholtz
*Attorney, Agent, or Firm*—Larson, Taylor & Hinds

[57] ABSTRACT

An unusual bacteriophage $\phi$ 6, ATCC No. 21781-B, containing a lipid coat and double-stranded ribonucleic acid has been isolated for the plant pathogenic bacterium *Pseudomonas phaseolicola* ATCC No. 21781. High yields of double-stranded ribonucleic acid may be obtained rapidly and expediently by cultivating a host bacterium for the bacteriophage, infecting the host bacteria with the bacteriophage to provide a lysate and recovering double-stranded ribonucleic acid from the separated bacteriophage.

The intact or whole bacteriophage, the bacteriophage with its lipid coat removed, and the isolated nucleic acid have all been found to be effective interferon inducers.

8 Claims, No Drawings

METHOD OF PREPARING HIGH YIELDS OF DOUBLE-STRANDED RIBONUCLEIC ACID

This invention relates to the production of interferon inducers and to a process for the preparation of double-stranded ribonucleic acid.

Although the use of vaccines has almost eliminated several major viral diseases such as polio and small pox in the United States, medical research has yet to provide a general means for treating virus diseases already established in the body or preventing their establishment. A limited number of drugs for combatting specific viral infections are currently available, but no broad-spectrum drug has yet been found.

The interferon system, however, has been recognized as a natural defense mechanism in animals and man against innumerable viral diseases. This system appears in the body within a few hours after virus invasion and can limit the spread of infection through the blood stream. The active component of this system is a substance called "interferon" discovered by Isaacs and Lindenmann in 1957. Out of research studies with interferon there developed an entirely new approach to the treatment of viral diseases — induction of the synthesis of interferon in the body in order to stimulate the the cell's natural defense mechanism. Since interferon itself was not available in sufficient quantities a search was begun for substances that were obtainable in large quantity and that could induce interferon. A variety of chemically and biologically heterogeneous substances were found which stimulate interferon formation in animals and protect them against virus infection. These included killed viruses, bacterial endotoxins, microorganisms, rickettsia, mold products such as statolon (later shown to be double-stranded RNA), and various large molecular-weight polyanions. Unfortunately, none of these interferon inducers are without shortcomings; all are subject to one or more of the following criticisms: excessive toxicity, high cost: benefit ratio, difficulty of preparation, low yields, slow production times and relatively poor interferon inducing capacities.

It has been established that the antiviral activity of many of these interferon inducers was attributable to the double-stranded ribonucleic acid contained therein. Subsequent tests with isolated double-stranded ribonnucleic acid (hereinafter referred to as ds-RNA) have confirmed it to be an interferon inducer and consequently an antiviral material.

Heretofore, the only double-stranded ribonucleic acid containing viruses have been from animals, higher plants or fungi. It has now been found that bacteriophages provide a new source of ds-RNA. At least one bacterial virus, bacteriophage $\phi$ 6 having the ATCC reference No. 21781-B, (hereinafter referred to as "phage $\phi$ 6", has been isolated which provides the means for the rapid and economical production and recovery of high yields of ds-RNA. The phage $\phi$ 6 has the following properties which are currently unique among viruses that attack bacteria:

1. The nucleic acid of the phage $\phi$ 6 is ds-RNA.
2. The virus has a lipid coat. Only one other bacterial virus, phage PM2, which infects a marine pseudomonad has been reported as having a lipid coat. Phage MP2, however, contains ds-DNA, not ds-RNA.
3. The intact virus, the virus with the lipid coat removed and the ds-RNA from the virus, have all been found capable of inducing the non-specific antiviral agent, interferon, in animals and tissue culture.
4. The virus appears to have a membranous, sac-like tail which apparently attaches to the pili of the host.

The phage $\phi$ 6 was isolated from *Pseudomonas phaseolicola* infected bean straw and found to exhibit extreme sensitivity to organic solvents and surface active agents which was the first indication that phage $\phi$ 6 might be different from more typical bacteriophages. Electron microscope studies showed the phage $\phi$ 6 to contain a head structure ranging from about 60 to 70 nm in diameter within a distinct but amorphous, sac-like structure which can be seen in both crude and purified preparations of phage $\phi$ 6. Attachment of the phage particle to only one or two pili per host cell was also seen. The nucleic acid gives a positive RNA reaction in the orcinol test, and has no deoxyribonucleic acid (DNA) according to the Dische reaction. The nucleic acid extracted from phage $\phi$ 6 was found upon examination to be ds-RNA. The evidence for the double-stranded nature of the ribonucleic acid is summarized below.

a. Resistance to RNase and spleen phosphodiesterase in high salt medium (1-2X sodium citrate buffer, 0.15 M NaCl, 0.015 M $Na_3$ citrate, pH 7.0 (SSC). However, it is sensitive to venom phosphodiesterase under the same condition.
b. Resistance to DNAase.
c. Resistance to formaldehyde, which reduced S values of marker single-stranded RNA.
d. Thermal denaturation was sharp, with Tm = 92° in 0.1X SSC and greater than 100° in 1X SSC.
e. Sensitivity to alkaline hydrolysis (0.4 N NaOH) under conditions which denature double-stranded DNA to single-strandedness.
f. Buoyant density in $Cs_2SO_4$ was 1.605 gm/cm$^3$, comparable with other ds-RNA's.
g. The preliminary base composition suggested that A = U and G = C.

| G | C | A | U |
|---|---|---|---|
| 29.5 | 28 | 22 | 21 | h. Migration in polyacrylamide gel electrophoresis was much slower than for single-stranded RNA.
i. Interferon induction is excellent (in tissue culture and in mice).

When the nucleic acid is extracted by phenol-SDS (sodium dodecyl sulfate) methods, three classes of nucleic acid are obtained, as distinguished by sucrose-density gradient analysis (14S, 15S and 17S) and polyacrylamide gel electrophoresis. The multiple components appear analogous to those obtained for reovirus (Shatkin, Sipe and Loh. 1968. "Separation of ten reovirus genome segments by polyacrylamide gel electrophoresis". J. Virology 2:966–991) and wound tumor virus (Wood and Striessle. 1970. "Wound tumor virus: Purification and fractionation of the double-stranded ribonucleic acid." VIrology 40: 329–334.) The function of the different segments in the plant and animal virus systems is unclear because of technical difficulties in working with them and their respective hosts. The relative ease with which phage $\phi$ 6 and its host may be manipulated lends itself to studies of the structure and function of such segments.

One object of the present invention, therefore, is to provide a process for the rapid production of high yields of purified ds-RNA.

Another object of the invention is to provide a novel process for the production of interferon in animals, embryonated eggs and tissue culture using a ds-RNA-containing bacteriophage.

Yet another object of the invention is to provide a substantially lipid-free bacteriophage having high interferon inducing activity.

A further object of the invention is to provide interferon-inducing compositions containing as the essential component a ds-RNA or fraction therefrom obtained from a ds-RNA containing bacteriophage.

According to the process of the invention high yields of ds-RNA are obtained in a rapid and convenient manner by cultivating in a nutrient medium a host bacteria, adding to the resulting growth of bacteria a bacteriophage containing ds-RNA capable of infecting said host bacteria to replicate said bacteriophage and provide a lysate, separating bacteriophage from the lysate and recovering ds-RNA from the separated bacteriophage.

In other aspects of the present invention, the phage $\phi$ 6 may be used to induce interferon production in animals, embryonated eggs and tissue cultures and may be made up into a variety of interferon inducing pharmaceutical compositions.

The phage $\phi$ 6 has been found to have numerous advantages over many known interferon-inducing viruses. For example, since phage $\phi$ 6 is a non-mammalian virus the hazard of human disease is eliminated. Also, because phage $\phi$ 6 is parasitic on a plant pathogen, it may be less likely to be allergenic than viruses from fungi, plants, or animals because of host contaminants. In addition the virus is less apt to be toxic than other viruses of fungi, plants or animals because it can be purified more readily and to a greater degree. Another advantage of phage $\phi$ 6 is that it can be produced far more rapidly than any comparable product. (For instance, phage $\phi$ 6 can be produced in less than a day whereas fungal viruses and synthetic RNA polymers generally take several days). Moreover, the quantity of effective material, (i.e. the whole virus and its nucleic acid) is much greater than any other process. Because the virus is lytic, it can be separated more readily from contaminating host material than other types of virus as effective in interferon production. Physical handling of the virus or its nucleic acid is also easier than other systems because of (a) the much greater quantity that can be produced at any one time, (b) the quantity per unit volume and (c) the ease with which host and other contaminating material can be removed from the virus. From a scientific standpoint, phage $\phi$ 6 may also be useful as a model system for studying the structure, synthesis and function of lipid and ds-RNAs of viruses.

The bacteriophage employed in the process of the invention may be any ds-RNA-containing bacteriophage such as phage $\phi$ 6. Isolation of the bacteriophage from plant material, soil, water or host bacteria may be effected by any of the isolation procedures well known in the art as, for instance, the procedure described by Vidaver, A. K. and Schuster, M. L. in J. Virology 4, 738 (1969) hereby incorporated by reference. In the case of phage $\phi$6, this bacteriophage may be isolated by employing the procedure described in the aforementioned publication modified only to include filtration of the lysate through a 0.45 $\mu$ membrane such as that produced by Millipore Corporation as set forth in more detail in the working Example I below.

The host bacteria grown and infected with the isolated bacteriophage of the invention may be any bacteria susceptible to infection by the isolated bacteriophage. As illustrative of such host bacteria there may be included strains of *Pseudomonas phaseolicola*, *Pseudomonas glycinea* and *Pseudomonas syringae*. The preferred host bacteria for growth and infection of phage $\phi$ 6 according to the present invention is *Pseudomonas phaseolicola* HB10Y, ATCC 21781.

The culture medium in which the host bacteria are cultivated may be either a natural nutrient medium, a synthetic nutrient medium, a semi-synthetic medium or a complex medium, as long as it contains the essential nutrients for the growth of the bacteria. Such substances are well known in the art and include materials such as a carbon source, a nitrogen source, inorganic compounds and the like in appropriate amounts which are utilized by the microorganism. Thus, as a carbon source, there may be mentioned by way of example, carbohydrates such as glucose, fructose, maltose, sucrose, starch, starch hydrolysate, molasses, etc.; other carbon sources such as organic acids, e.g. acetic acid, lactic acid, etc. These substances may be used singly or together. As a nitrogen source, various kinds of inorganic or organic salts or compounds such as urea, liquid ammonia, or ammonium salts such as ammonium chloride, ammonium sulfate, ammonium nitrate, ammonium acetate, ammonium phosphate, etc; or natural substances containing nitrogen such as cornstarch liquor, yeast extract, meat extract, peptone, fish meal, bouillon, casein hydrolysates, casamino acid, fish solubles, rice bran extract, etc., may be employed. Again these substances may be used either singly or in combination of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

The preferred culture media for the growth of *P. phaseolicola* are the semi-synthetic mixture, SSM or the complex medium, NBY.

SSM medium is composed of 0.2 g. $MgSO_4 \cdot 7H_2O$, 6.0g $\cdot Na_2HPO_4$, 3.0 g $\cdot KH_2PO_4$ and water to 850 ml, to which 50 ml of 10 percent glucose and 100 ml of 20 percent casein hydrolysate is added after sterilizing separately. NBY is a nutrient broth-yeast extract medium composed of 8.0 g nutrient broth, 2.0 g yeast extract, 2.0 g. $K_2HPO_4$, 0.5 g $KH_2PO_4$ and water to 960 ml, to which 1 ml. of 1 M $MgSO_4 \cdot 7H_2O$ and 50 ml. of 10 percent glucose is added after sterilizing separately.

The fermentation of the host cells is advantageously carried out under aerobic conditions. Direct aeration as by rotating or agitating the culture medium have proven to be successful in promoting optimal growth. For phage $\phi$ 6 or bacteriophage production the cultivation of the host cells is optimally carried out at 24–26°C until the growth reaches an optical density (O.D.) of at least about 0.09 – 0.12 (about 2 × $10^8$ cells/ml) at a $\lambda$ of 640 mm. Ordinarily, growth to an O.D. of 0.09 – 0.12 occurs in about 2 – 4 hours, when freshly grown cells are used as a source of inoculum. The ds-RNA-containing phage is then added at a phage : bacterium ratio of 1:4 to 1:6 but may be higher or lower as the situation demands. The bacterial multiplication or incubation is allowed to continue until lysis of the host bacterial cells is effected and the replicated bacteriophage content of the bacterial cells released. In general, an incubation period of about 7–8 hours provides titers of phage φ 6 ranging from about $0.5–5 \times 10^{11}$ PFU (plague-forming units) per ml of crude lysate. Longer incubation periods do not appear to increase the titer.

Alternatively a higher phage : bacterium ratio may be used to obtain lysates in a shorter time. For example, the bacteria are grown to an O.D. of about 0.5 from an initial O.D. of about 0.10. This growth takes about 5 hours at 24–26 C. The bacteriophage φ 6 is then added to the bacteria at a ratio of 5:1. Incubation is continued for an additional 2 hours and 40 minutes, after which the lysate may be stored or treated as below. Titers of plaque-forming units are comparable to the longer incubation process.

The bacteriophage component of the crude lysate can be separated therefrom by any of the separation procedures well known in the art. The bacteriophage in the crude lysate can be first concentrated, for example, by the addition of polyethylene glycol in the presence of sodium chloride. The very substantial concentrate of bacteriophage thus obtained can be separated, for instance, by centrifugation. The separated phage concentrate can be used as such but is preferably subjected to further purification as, for example, by the well known sucrose or cesium chloride density gradient purification technique.

Removal of substantially all or part of the lipid coat of the phage φ 6 is found to increase the interferon-inducing capacity of the phage φ 6. The lipid can be removed from the phage concentrate by extraction with equal volumes of a lipid solvent such as chloroform, ether, mixtures of chloroform and methanol or by treatment of the phage with lipid enzymes, such as lipase.

The separated phage φ 6, intact, or with lipid removed can be taken up in distilled water or a suitable buffer solution such as a 0.01 M phosphate buffer (pH 7.1), containing $10^{-3}$ M Mg and stored at −20°C. If desired, the intact phage φ 6 or phage φ 6 with lipid removed may be freeze-dried for storage, but infectivity of the whole phage is lost under these conditions.

DS-RNA can be recovered from the phage concentrate by any one of the conventional techniques of the art for obtaining ds-RNA from ds-RNA-containing viruses such as the recovery procedures described in U.S. Pat. Nos. 3,108,047; 3,582,465; 3,582,468 and 3,583,893 and the journal article by Fields et al. entitled "Inducers of Interferon and Host Resistance, IV. Double-stranded Replicative Form RNA (MS2-RF-RNA) from E. coli infected with MS2-coliphage" appearing in the Proceedings of the National Academy of Sciences (U.S.), Vol. 58, No. 5 (November, 1967), pp. 2102–2108, all incorporated herein by reference.

Most conveniently, the ds-RNA may be recovered from the phage by adding a deproteinizing solvent to an aqueous dispersion of the separated phase to extract protein and recovering the aqueous phase containing the ds-RNA.

A preferred ds-RNA recovery method of this type employs either a single or two-phase system of a deproteinizing solvent such as phenol. In the single-phase system, an aqueous medium containing the phage is taken up in, for instance, a phenol-ethanol mixture in which the nucleic acid, ds-RNA and the denatured protein in the phage both precipitate because of the presence of the ethanol. The precipitate is pelleted by centrifugation and the pellet resuspended in an aqueous medium in which the ds-RNA is soluble and the protein insoluble. The aqueous solution of ds-RNA is then precipitated by the addition of an appropriate nucleic acid precipitating agent such as ethanol and the precipitate of ds-RNA then pelleted by centrifugation. In the two-phase system a deproteinizing solvent such as phenol is added to an aqueous medium containing the phage. The mixture separates into an aqueous phase containing the ds-RNA, a solvent phase and an interface containing denatured protein. The aqueous phase is then decanted and the ds-RNA precipitated and pelleted as described above in the single phase extraction system.

The ds-RNA obtained by the process of the invention can be prepared, stored and used in a variety of pharmaceutical forms. An aqueous solution of the ds-RNA can be sterilized by storage in ether at 3°C. and pH 8.6 for a short time, after which the ether layer can be separated, the dissolved ether stripped out, the pH adjusted to around 7 with sterile acid and the sterile solution filled into suitable vials or ampoules. The ds-RNA may, in addition, be prepared by freeze-drying in vials or ampoules, in combination with a suitable stabilizer such as glucose, mannitol, sorbitol or the like.

The interferon-inducing compositions of the invention comprise an effective amount of the intact phage φ 6 or phage φ 6 having lipid removed therefrom, the ds-RNA itself, or fraction derived therefrom, in a pharmaceutically acceptable carrier. The particular concentration of the phage φ 6 in the pharmaceutically acceptable carrier will vary depending upon whether an intact phage or substantially lipid-free or lipid-reduced phage is used, or ds-RNA fraction and the particular cell, tissue or host for which it is intended. In general, pharmaceutical compositions for inducing interferon in animals contain phage φ 6 concentrations ranging from at least about 10 mg up to 250 mg. The compositions may conveniently be made up as injectable preparations comprising about $10^{11}$ to $10^{13}$ phage φ 6 particles per ml. The pharmaceutically acceptable carrier will generally be a diluent such as a sterile liquid, e.g. sterile, distilled water, saline, saline-sodium citrate solutions, phosphate buffer solutions, parenterally acceptable oils, oily esters or other non-aqueous media such as propylene glycol, containing, if desired, suspending, dispersing, stabilizing, preserving, emulsifying or buffering agents. The pharmaceutically acceptable carrier may also be any of the conventional solid or semi-solid compositions suitable for say topical or oral administration such as sugars, starches, gelatin, ointments, creams, aerosol preparations and the like.

Interferon may be induced by administering ds-RNA obtained by the process of the invention in effective amounts to an animal, including man, an embryonated cell or a susceptible tissue culture. According to another aspect of the present invention interferon may also be induced by similarly administering either the intact phage φ 6, the phage φ 6 with lipid removed or ds-RNA fraction obtained from the phage φ 6. The administration may be by topical application to susceptible tissue, or by application intranasally; or for systemic application, by intravenous or intraperitoneal injection.

The effective amounts of the phage will vary depending upon the form of application and whether an intact phage or phage treated for lipid removal or ds-RNA alone is used. In systemic application, for instance, the amount of phage will fall in the range of about 0.5 to $1.0 \times 10^{13}$ particles per kilogram of body weight.

Inoculation of tissue cultures or embryonated eggs are the two systems generally used to induce the elaboration of interferon for recovery and purification. In the inoculation of embryonated eggs, interferon-containing allantoic fluid can be prepared by injecting hens' eggs incubated for 9–12 days with about $10^{11}$ to $10^{13}$ phage $\phi$ 6 particles/ml and incubating the infected eggs for a time sufficient (usually at least 72 hours) to induce interferon induction. The eggs are then chilled and the allantoic fluid containing interferon is withdrawn. An interferon-containing tissue culture filtrate (TCF) can be prepared by inoculating the phage $\phi$ 6, the phage $\phi$ 6 with lipid removed or ds-RNA from phage $\phi$ 6 into tissue culture and incubating until production of interferon has been induced. When phage $\phi$ 6 is used as the inoculum, inoculation with about $10^9$ to $10^{11}$ particles/ml is generally satisfactory for interferon induction. The tissue cultures are prepared by well known methods using tissues that are conventionally employed for this purpose including mouse embryo fibroblasts or lung tissue, chick embryo fibroblast cells or chorioallantoic membrane, monkey kidney tissue, hamster kidney or embryonic tissue, rabbit skin, testes or kidney, calf kidney, L cells, human embryonic lung and kidney tissue, human amnion and the like.

Interferon can be concentrated and purified from the crude harvest fluid obtained by the egg culture or tissue culture procedures by any of the well known techniques of the prior art such as the procedure described in U.S. Pat. No. 3,256,152.

The following examples are included to further illustrate the invention but are not to be construed as limiting the invention.

EXAMPLE I

Isolation of Bacteriophage, $\phi$ 6

About 2 grams of bean straw are added to 30 ml. of exponentially growing *Pseudomonas phaseolicola* strain HB10Y in 250 ml. Delong flasks containing NBY nutrient medium. The cultures are incubated for 20–24 hours at 25°C on a rotary shaker at 150 revolutions/minute. After allowing debris to settle, the supernatant fluid is decanted and centrifuged at $20,000 \times g$ for 10 minutes. The supernatant fluid is filtered through a Millipore, 0.45 $\mu$ membrane filter to recover the phage $\phi$ 6.

The phage $\phi$ 6 isolate is purified by three successive single-plaque isolations on the original host.

A single plaque is then stabbed into 1 ml of NBY or buffer and used to inoculate *Pseudomonas phaseolicola* cells in the following manner.

Lysate Production

*Pseudomonas phaseolicola* host cells are grown in a 500 ml flask on a shaker at 150–300 rpm or 1 liter fermentor vessel with NBY as the nutrient medium. The host cells are grown to an optical density (O.D.) (Bausch and Lomb Spectronic 20, 640 mu) of 0.09–0.12 (about $2 \times 10^8$ cells/ml) at which time phage $\phi$ 6 is added at a phage : bacterium ratio of 1:4 to 1:6. For scale-up/procedures, the host cells are grown as above in a 14 liter capacity bench top fermentor using 7 liters of NBY. Aeration is set at 16 liters/minutes and mixing at 500 rpm at 26 C. Phage $\phi$ 6 is added as above. A commercial antifoam agent (Union Carbide SAG 4130) is added in an amount of from 0.5 to 1.0 ml. The incubation is continued for 7–8 hours after which considerable but not total clarification occurs. Titer lysates in the range of $0.5 - 4 \times 10^{11}$ PFU/ml for phage $\phi$ 6 are routinely obtained if fresh cells are used for the inoculum. Longer incubation periods do not increase the titer. The resulting lysates are stored at 4°C for 24 to 72 hours, warmed to 26°C, and treated with 1 $\mu$ g/ml DNAse (Worthington Biochemical Corporation) added in the presence of $10^{-3}$ M $MgSO_4 \cdot 7H_2O$ and lysate is allowed to set at room temperature (26°C) for 3 hours after which it is centrifuged at $16,000 \times g$ for 10 minutes to remove bacterial debris. The decanted lysate is saved and stored at 4°C.

Preparation of Phage $\phi$ 6 Concentrate

The bacteriophage thus obtained is concentrated by adding to the above 7 liters of lysate 10 percent (w/v) polyethylene glycol (PEG) 6000 powder (Union Carbide) in the presence of 0.5 M NaCl according to the technique of Yamamoto, K. R., B. M. Alberts, R. Benzinger, L. Lawhorne and G. Treiber, Virology 40, 734 (1970). The treated lysate is allowed to set for 3 to 4 hours at 4°C to ensure good sedimentation. Approximately 60 percent of the phage is sedimented. The phage is pelleted by centrifugation at 10,000 rpm/10 min. and the pellet resuspended in cold 0.01 M $PO_4$ buffer (pH 7.1), containing $10^{-3}$ M Mg (Buffer A), to a volume of 1 percent of the former total volume of lysate, i.e., 60–70 ml, and stored at 4°C.

Sucrose and Cesium Chloride Gradient Purification

The phage is further purified on 10–35 percent linear sucrose gradient columns equilibrated with Buffer A. Four to five ml of the above concentrated material are placed in a SW27.1 swinging bucket rotor and centrifuged at 23,000 rpm for 1 hour and 15 minutes. The zone containing the infective units, 1 per gradient, is removed by means of a sterile 5-ml syringe with bent needle. Gradients are scanned with a UV photometric analyzer and the fractions collected. After it has been determined that the peak UV absorbing material corresponds to the peak infectious titer, only the peak material is collected from the gradients. Further purification of phage $\phi$ 6 may be accomplished by a 6 to 8 hour centrifugation at $70,000 \times g$ on a 30 – 60 percent linear sucrose gradient column equilibrated with 0.01 M potassium phosphate buffer, pH 7.1. Again a correspondence between UV- absorbing material and infectivity occur.

Sucrose is removed by overnight dialysis against Buffer A. The purified phage $\phi$ 6, is pelleted by centrifugation at $62,000 \times g$ and frozen at −70°C.

Alternatively, purification may be accomplished by mixing 1–2 ml of PEG concentrated material with 30 percent cesium chloride w/v in 1 × SSC and centrifuging to equilibrium in a Ti 50 fixed angle rotor at 40,000 rpm for 15 hours at 4 C. The phage from the PEG concentrate may be further concentrated before mixing with the cesium chloride by centrifuging at 8–10,000 rpm for 10 minutes to remove debris, decanting the supernatant fluid and centrifuging at 28,000 rpm in a no. 30 angle rotor for 2 hours. The pellet is resuspended to the desired volume in Buffer A; 1–2 ml of this concentrated $\phi$ 6 material is then mixed with the cesium chloride as above. Any remaining air space in the tubes is filled by a layer of mineral oil. Only one infectious zone appears, corresponding to the UV-absorbing material. The infectious zones are removed as before, diluted at least 1:5 with Buffer A and centrifuged at 28,000 rpm in a no. 30 rotor for 2 hours at 4 C to pellet the phage and dilute out the cesium chloride. Pellets are then resuspended in Buffer A to the desired volume.

Extensive delays in treatment following the initial lysate preparation result in aggregation or disintegration of the virus and increased non-infectious light scattering zones on the sucrose gradients.

EXAMPLE II

The procedure of Example I is repeated substituting *Pseudomonas glycinea* strains or *Pseudomonas syringae* strains for the *Pseudomonas phaseolicola* host cells in the lysate production. Similar high concentrations of phage $\phi$ 6 are obtained in both instances.

EXAMPLE III

The lipid envelope of the purified phage of Example I is extracted with a 3:1 (v/v) chloroform : methanol solution.

A chloroform : methanol extract is also made from an equivalent quantity of another phage $\phi$ 91 known to be non-lipid, purified in a manner identical to phage $\phi$ 6. This serves as a control to indicate the extent of lipid contamination from the host cells.

A chloroform: methanol extract is also made from uninfected *Pseudomonas phaseolicola* cells grown to an O.D. of 0.4 at 640 mu (about 8 × 10$^8$ CFU/ml). The cells are harvested by centrifugation, washed 3 times with Buffer A, and frozen before extraction. Fatty acids in the chloroform : methanol extracts were converted to methyl esters by the interesterification procedure described by Tulloch et al., appearing in the Canadian Journal of Microbiology 5:485, 1969.

Fatty acids analyses are performed on F and M gas chromatograph, model 402, by use of a hydrogen flame detector. The column is made up of 15 percent diethyleneglycol adipate polyester on Gas-Chrom P, 60–80 mesh, packed in a 4-ft glass column with an internal diameter of one-eighth in. The column temperature is either programmed from 140°C to 190°C or run isothermally at 190°C. The injection port and detector block temperatures are both 240°C. Hydrogen, helium, and oxygen flow rates are 35, 100, and 300 ml per min., respectively. Quantitative analyses are done with a planimeter. The methyl esters of the fatty acids are identified by comparing the retention times of the extracted acids with known standard fatty acid methyl esters obtained from Applied Science Laboratories.

After methylation the extracts are spotted onto thin layer plates containing Silica Gel 6 and developed with heptane:ether (9:1 v/v). The plates are sprayed with 0.2 rhodamine in 95 percent ethanol and examined under ultraviolet light. Several spots appear on the thin layer plates with the extract from $\phi$ 6, which have similar Rf values to those from the *P. phaseolicola* extract. No spots are observed with the extract from $\phi$ 91. The region containing the typical methylated fatty acids is removed, extracted with chloroform evaporated to dryness and taken up in hexane for analyses by gas chromatography.

From the Table below, it can be seen that the fatty acid composition of phage $\phi$ 6 is similar to that of the host bacterium. Gas chromatography analysis of the same region from thin layer plates of $\phi$ 91 extracts indicate that less than 5 percent of the fatty acids attributed to $\phi$ 6 could be accounted for by general contamination of the host cells.

Fatty Acid Composition of *Pseudomonas phaseolicola* and Phage $\phi$ 6

(Values are the percentage of the individual fatty acids in the total fatty acid fraction.)

| Fatty Acid | P. phaseolicola | Phage |
| --- | --- | --- |
| 14:0 | 0.5 | 2.3 |
| 15:0 | 0.2 | 0.4 |
| *unknown a | 0.3 | 0.9 |
| 16:0 | 34.7 | 33.1 |
| 16:1 | 42.7 | 40.4 |
| 17:0 | 0.1 | trace |
| *unknown b | 0.6 | trace |
| *unknown c | 0.7 | 1.0 |
| 18:0 | 0.7 | 1.0 |
| 18:1 | 20.0 | 21.0 |

*Unknowns a, b and c gave relative retention values of 15.5, 17.4 and 17.7, respectively.

Separate experiments in which the dry weight of the phage is determined before and after chloroform:methanol extraction indicate that phage $\phi$ 6 is composed of approximately 25 percent chloroform:methanol extractable lipid and 75 percent nucleoprotein. The buoyant density of the whole or intact phage, determined by CsCl$_2$ equilibrium centrifugation, is 1.27 gm/cc which is similar to other lipid containing viruses. Again the UV absorbing material is found to correspond to the region of infectivity.

EXAMPLE IV

Extraction of Double-Stranded RNA

Ten ml of dialyzed solution of phage $\phi$ 6 concentrated and purified as described in Example I is adjusted to .25 M KPO$_4$ buffer and 38 milligrams of bentonite are added. 16 ml of ethanol are then added, followed by the addition of 33 ml of a 2:1 mixture of phenol:ethanol. The mixture is allowed to set for 4 hours at room temperature, centrifuged and the supernatant fluid discarded. The resulting pellet of denatured protein and ds-RNA is taken up in 4 ml of tris potassium-magnesium buffer (0.01 M tris (hydroxymethyl) aminomethane; 0.01 M K Cl; 10$^{-4}$ M MgCl$_2$, pH 7.4) and centrifuged. The resultant supernatant fluid containing ds-RNA is decanted and saved. The remaining pellet is again taken up in another 4 ml of the buffer and the centrifugation repeated. The supernatant solution of this centrifugation is combined with the first supernatant solution. To the combined supernatant solution is added 2 volumes of ethanol to precipitate ds-RNA which is pelleted by centrifugation.

In the following Examples V and VI, the interferon in the serum is determined by means of the mouse L-cell-vesicular stomatitis virus plaque reduction assay system.

EXAMPLE V

Interferon Inducement

A. The intact phage $\phi$ 6 obtained as a purified concentrate according to the procedure of Example I is injected into mice to determine its interferon-inducing capacity. Concentrated phage φ 6 solvent extracted or treated with pancreatic lipase to remove lipid associated with the phage is also injected to determine whether lipid removal increases the quantity of interferon induced.

The solvent extraction of the concentrated phage φ 6 is conducted using equal volumes of either ethyl ether or chloroform. The treatment with lipase is done with pancreatic lipase from Worthington Biochemical at a concentration of 15 units/ml, pH 8.0, incubated at 37°C for 1 hour.

An equivalent of $1.88 \times 10^{11}$ phage particles per mouse are injected intraperitoneally in each case. The carrier for the particles is a sterile 1 × SSC. After 16 hours the mice are bled and serum assayed for interferon. The results are as follows:

|  | Units of Interferon per 2.5 ml of serum |
|---|---|
| φ 6 phage (intact) | 205 |
| φ 6 phage, ether extracted | 801 |
| φ 6 phage, chloroform extracted | 320 |
| φ 6 phage, lipase treated | 325 |

The results demonstrate that the intact phage φ induces interferon production and that removal of the lipid from the phage increases the quantity of interferon induced. The ether-extracted phage is found to give the highest production of interferon.

B. The intact phage φ 6 is tested for interferon inducement by injection intraperitoneally at concentrations of $8.5 \times 10^{11}$ or $1 \times 10^{11}$ particles in saline citrate for mouse. At the concentration of $1 \times 10^{11}$ particles/mouse, little, if any, interferon induction is found. Intraperitoneal injections of $8.5 \times 10^{11}$ particles of phage φ 6 give a titer of 350 units of interferon per 2.5 ml blood serum.

C. Chloroform and lipase treated phage φ 6 are also tested for interferon inducement by intravenous injection in mice. Chloroform-treated phage φ 6 at $1 \times 10^{11}$ particles in saline citrate per mouse injected intraveneously (IV) produces 525 units of interferon/2.5 ml serum. Lipase treated phage φ 6 at $1 \times 10^{11}$ particles/mouse, injected IV produces 340 units.

EXAMPLE VI

Interferon Inducement by Double-Stranded RNA from Phage φ 6

A. Double-stranded RNA obtained from phage φ 6 is injected intraperitoneally into mice at a level of 10 micrograms in saline citrate per mouse. After 8 hours the mice are bled and the interferon in the serum determined. At the level of 10 micrograms, the ds-RNA produced 1000 units of interferon per 2.5 ml of serum.

B. Double-stranded RNA obtained by phenol extraction of phage φ 6 was also tested for interferon-inducing capacity by intraveneous (IV) injection with 10-30 micrograms in saline citrate/mouse. Titers of 2000 units/2.5 ml serum were obtained.

EXAMPLE VII

Interferon-Induction in Embryonated Eggs

Hens' eggs are incubated for 9–12 days and inoculated with $10^{10}$ particles of phage φ 6 per egg suspended in 1 × SSC. The inoculated eggs are then incubated for 96 hours at 36–37°C after which the eggs are chilled and the allantoic fluid containing interferon is withdrawn from the eggs.

EXAMPLE VIII

Interferon-Induction in Tissue Culture

A mouse lung tissue culture is prepared from trypsinized mouse embryo tissue from 15–18 day old mouse embryos as by the method of Dulbecco and Vogt, J. Experimental Medicine, 99 (1954), p 167. Blake bottles containing the tissue culture are inoculated with $10^7$–$10^8$ phage φ 6 particles (suspended in saline citrate of Example VII) per cell monolayer. The inoculated tissue culture is then incubated at 37°C for 72 hours. The tissue culture fluid containing interferon is then harvested by decantation.

It is claimed:

1. A method for producing high yields of double-stranded ribonucleic acid which comprises cultivating in a nutrient medium host bacteria, adding to the resulting growth of bacteria a bacteriophage containing double-stranded ribonucleic acid capable of infecting said host bacteria to replicate said bacteriophage and provide a lysate, separating bacteriophage from said lysate and recovering double-stranded ribonucleic acid from the separated bacteriophage.

2. The method of claim 1 wherein the double-stranded-containing bacteriophage is phage φ 6 having the ATCC reference No. 21781-B.

3. The method of claim 2 wherein the host bacteria are selected from strains of *Pseudomonas phaseolicola*, *Pseudomonas glycinea* and *Pseudomonas syringae*.

4. The method of claim 3 wherein the host bacteria are *Pseudomonas phaseolicola*, having ATCC reference No. 21781.

5. The method of claim 3 wherein the phage φ 6 is added when the *Pseudomonas phaseolicola* count is in the range of about $2 - 10 \times 10^8$ cells per ml of nutrient medium.

6. The method of claim 2 wherein the recovery of said double-stranded ribonucleic acid comprises adding a deproteinizing solvent to an aqueous dispersion of said separated phage φ 6 to extract protein, centrifuging the mixture and recovering the resulting aqueous phase containing double-stranded ribonucleic acid.

7. The method of claim 6 wherein prior to said phenol extraction liquid is removed from said phage φ 6 by extraction with a lipid solvent or by treatment with lipid-removing enzymes.

8. The process of claim 6 wherein the deproteinizing solvent is phenol or phenol sodium dodecyl sulfate.

* * * * *